H. O. ALLEN.
HOSE CLAMP.
APPLICATION FILED NOV. 29, 1911.

1,049,968.

Patented Jan. 7, 1913.

Witnesses

Inventor
Horace O. Allen
By Victor J. Evans
Attorney

UNITED STATES PATENT OFFICE.

HORACE O. ALLEN, OF ELLWOOD CITY, PENNSYLVANIA.

HOSE-CLAMP.

1,049,968. Specification of Letters Patent. Patented Jan. 7, 1913.

Application filed November 29, 1911. Serial No. 662,985.

*To all whom it may concern:*

Be it known that I, HORACE O. ALLEN, a citizen of the United States, residing at Ellwood City, in the county of Lawrence and State of Pennsylvania, have invented new and useful Improvements in Hose-Clamps, of which the following is a specification.

This invention relates to hose clamps or couplings, the object of the invention being to provide a safety clamp for coupling a rubber tube or hose to gas nipples or pipes. which clamp may be quickly applied and released and will hold the hose firmly so as to absolutely prevent leakage.

The invention consists of the features of construction, combination and arrangement of parts, hereinafter fully described and claimed, reference being had to the accompanying drawing, in which:—

Figure 1:
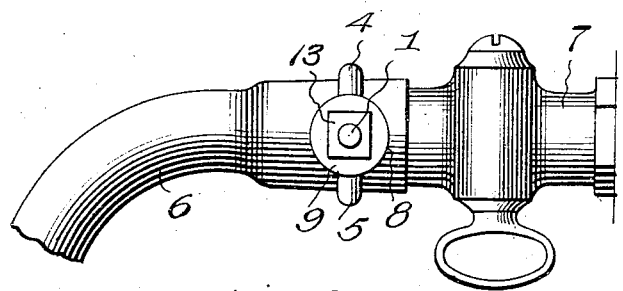
Figure 2:
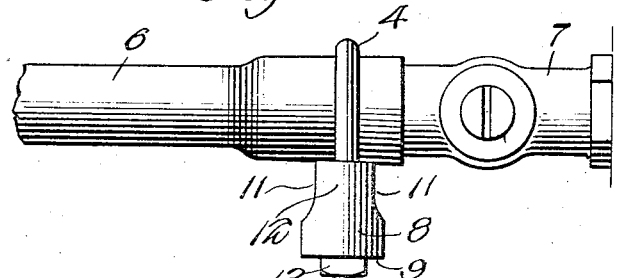
Figure 3:
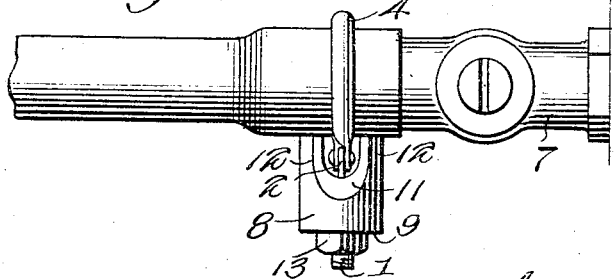
Figure 4:
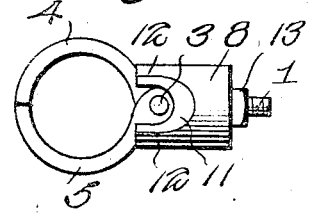
Figure 5:
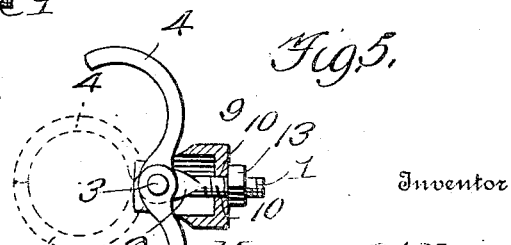

Figure 1 is a side elevation showing the application of the invention. Fig. 2 is a top plan view thereof. Fig. 3 is a view similar to Fig. 2 showing the sleeve turned to release the jaws. Fig. 4 is a side view of the hose clamp or coupling when locked shut. Fig. 5 is a cross-sectional view of the hose clamp or coupling when in opened position.

In carrying my invention into practice, I provide a threaded stem 1, flattened and apertured at one end to form an eye 2, through which extends a pivot pin 3. Pivotally mounted upon said pin on opposite sides of the eye is a pair of hook-shaped or substantially semi-circular clamping jaws 4 and 5 which are adapted to surround the hose or tube 6 and clamp the same against the nipple or pipe 7 sufficiently firm and close to prevent leakage. A sleeve 8 is mounted upon the stem for rotary and sliding movements and is provided at its outer end with a head 9 formed with an opening 10 corresponding in diameter to the stem to adapt it to be fitted thereon. At its inner end the sleeve is provided with cut-away portions or openings 11 at diametrically opposite sides, thus forming intermediate, diametrically opposed partially circular fingers or projections 12 arranged at right angles to said apertures. A nut 13 is provided to engage the stem and hold the sleeve in applied position. The fingers 12 are adapted to be positioned to overhang and engage the pivoted ends of the jaws 4 and 5 to hold said jaws in closed position, in which position of the jaws the apertures 11 are disposed on opposite sides of the pivot 3. Upon relaxing the nut 13, the sleeve may be drawn rearwardly and given a quarter turn to bring the apertures 11 in line with the pivoted ends of the jaws, allowing said jaws to be swung open in a ready and convenient manner.

After one end of the hose or tube 6 has been fitted upon the nipple or pipe 7, the clamp with the jaws in open position is brought into proximity to the end of the hose and the jaws then closed about the same, after which by turning the sleeve to holding position and tightening the nut 13 the jaws will be held firmly and securely against opening movement. As a result, the tube 6 will be firmly and closely clamped against the surface of the pipe 7, thus preventing possible casual disengagement of the tube from the pipe and also any liability of leakage. Upon relaxing the nut and turning the sleeve to releasing position, the jaws may be opened in an obvious manner for the removal of the clamp, whenever it is desired to detach the hose or tube.

Having thus described the invention, what I claim as new is:—

1. A hose clamp or coupling comprising a threaded stem, a pair of clamping jaws pivotally hinged thereto, a sleeve having diametrically disposed bearing fingers so arranged as to form openings therebetween, said sleeve being adjustable on the threaded stem to dispose either the fingers or the openings in line with the pivoted ends of the jaws, and means for holding said sleeve in jaw-clamping position.

2. A hose clamp or coupling comprising a threaded stem, a pair of clamping jaws pivotally connected with one end of the stem, an incasing sleeve adjustably mounted on the stem and provided with diametrically disposed clamping fingers and releasing apertures, said fingers and apertures being arranged at right angles to each other, the said sleeve being adjustable to bring either the fingers or the apertures in line with the pivoted ends of the jaws to clamp said jaws or permit them to be opened, and a nut engaging the stem to clamp the incasing sleeve in applied position.

3. A hose clamp coupling comprising a cup-like sleeve having on opposite sides thereof extension bearing fingers, an aperture in the end wall of said sleeve, a threaded rod running through said aperture, an adjustable locking nut on the outer end of said rod, two oppositely hinged, pivotally mounted clamping members attached to the inner end of said rod, said clamping members being bent to semi-circular form to bite a hose at all points when clamped around same, said device being fully clamped about a hose and locked into clamping position by said adjustable locking nut, substantially as specified.

In testimony whereof I affix my signature in presence of two witnesses.

HORACE O. ALLEN.

Witnesses:
ALBERT BRENNER,
J. P. MORRISON.